US012718050B2

(12) United States Patent
Yilmaz et al.

(10) Patent No.: US 12,718,050 B2
(45) Date of Patent: Aug. 25, 2026

(54) HARDWARE AND DEEP LEARNING BASED AUTHENTICATION THROUGH ENHANCED RF FINGERPRINTING

(71) Applicant: University of South Florida, Tampa, FL (US)

(72) Inventors: Yasin Yilmaz, Tampa, FL (US); Gokhan Mumcu, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 18/612,083

(22) Filed: Mar. 21, 2024

(65) Prior Publication Data

US 2024/0320459 A1 Sep. 26, 2024

Related U.S. Application Data

(60) Provisional application No. 63/491,748, filed on Mar. 23, 2023.

(51) Int. Cl.
*G06K 19/073* (2006.01)
*G06K 7/10* (2006.01)

(52) U.S. Cl.
CPC ... *G06K 19/07345* (2013.01); *G06K 7/10366* (2013.01)

(58) Field of Classification Search
CPC .................... G06K 19/07345; G06K 7/10366
USPC .......................................................... 235/451
See application file for complete search history.

(56) References Cited

U.S. PATENT DOCUMENTS

| | | | | |
|---|---|---|---|---|
| 5,661,494 | A * | 8/1997 | Bondyopadhyay | H01Q 1/364 343/700 MS |
| 7,705,736 | B1 * | 4/2010 | Kedziora | A01K 27/009 340/573.3 |
| 2010/0328174 | A1 * | 12/2010 | Romanofsky | H01Q 15/148 343/754 |
| 2015/0227641 | A1 * | 8/2015 | Govoni | G06F 30/36 703/2 |
| 2020/0334345 | A1 * | 10/2020 | Young | G06F 21/32 |
| 2022/0278856 | A1 * | 9/2022 | Mumcu | B33Y 10/00 |
| 2023/0147781 | A1 * | 5/2023 | Timofejevs | G10L 25/51 704/232 |
| 2024/0125898 | A1 * | 4/2024 | Bronstein | G01S 7/417 |

(Continued)

*Primary Examiner* — Michael G Lee
*Assistant Examiner* — David Tardif
(74) *Attorney, Agent, or Firm* — Meunier Carlin & Curfman LLP

(57) ABSTRACT

Radio frequency (RF) fingerprinting is a hardware-based authentication technique based on distinct distortions in the received signal due to the unique hardware differences of the transmitting device. Existing RF fingerprinting methods only utilize the naturally occurring hardware imperfections during fabrication, hence their authentication accuracy is limited in practical settings even when state-of-the-art deep learning classifiers are used. In this work, we propose a Chaotic Antenna Array (CAA) system for significantly enhanced RF fingerprints and a deep learning-based authentication method for CAA. We provide a mathematical model for CAA, explain how it can be cost effectively manufactured by utilizing mask-free laser-enhanced direct print additive manufacturing (LE-DPAM), and comprehensively analyze the authentication performance of several deep learning classifiers for CAA.

11 Claims, 6 Drawing Sheets

(56) References Cited

U.S. PATENT DOCUMENTS

2024/0163111 A1* 5/2024 Karabacak ............ H04L 9/3247
2024/0320459 A1* 9/2024 Yilmaz ............ G06K 19/07345

* cited by examiner

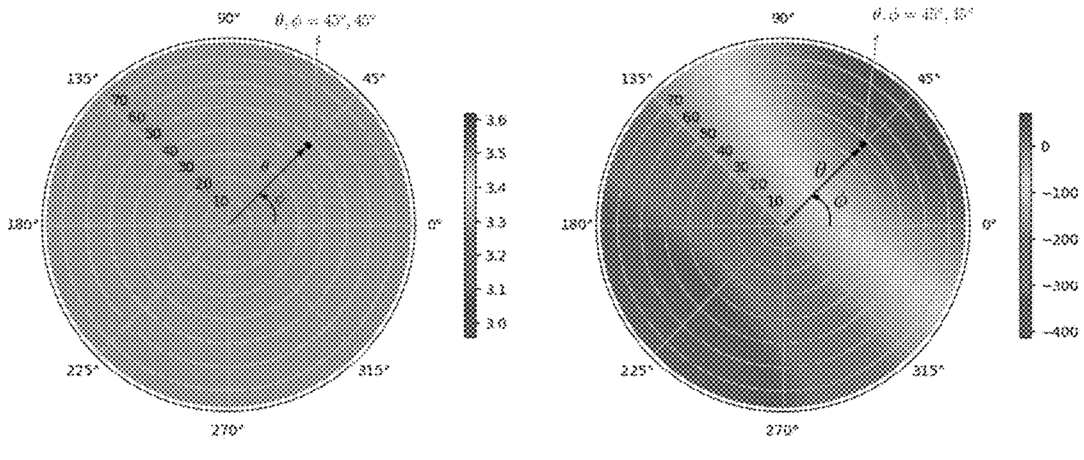
FIG. 3A
FIG. 3B
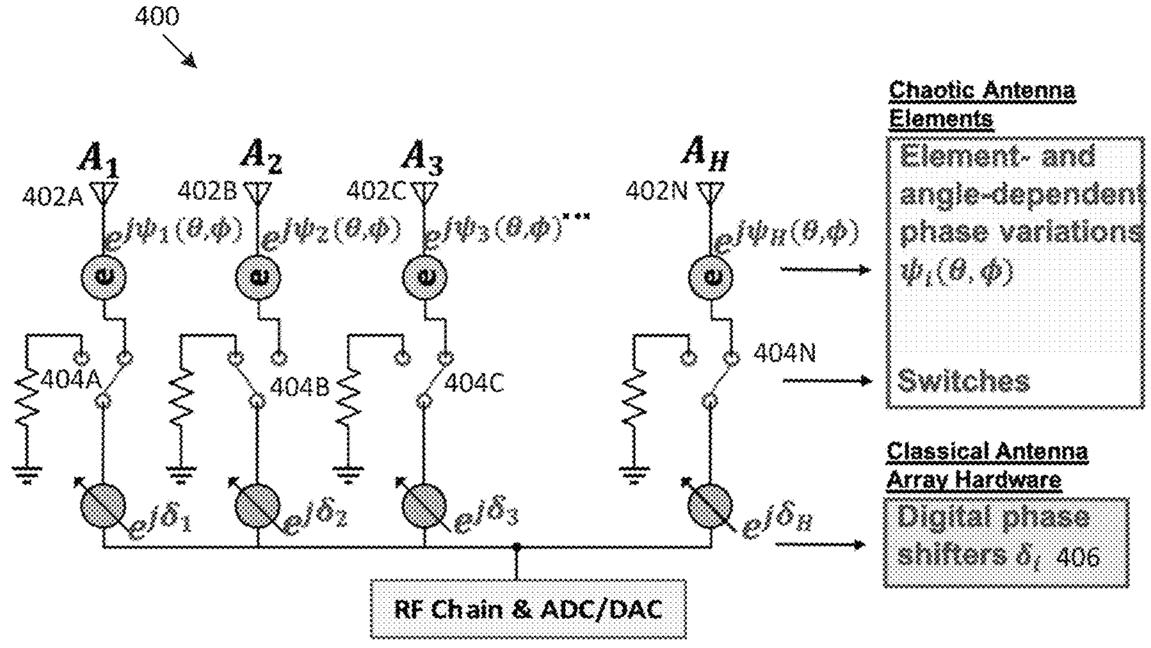
FIG. 4

HARDWARE AND DEEP LEARNING BASED AUTHENTICATION THROUGH ENHANCED RF FINGERPRINTING

CROSS-REFERENCE TO RELATED APPLICATIONS

The application claims the benefit of priority to U.S. Provisional Patent Application No. 63/491,748, filed Mar. 23, 2023, entitled "TOUCAN: Token-based Continuous Authentication using Unclonable Antenna Arrays," the disclosure of which is expressly incorporated herein by reference in its entirety.

BACKGROUND

Conventional online security models generally authenticate users with a username and password. There are many deficiencies in password-based authentication, such as password reuse, low-quality passwords, brute force attacks, etc., that make password-only authentication insufficient. An improvement to password-only authentication is multi-factor authentication (MFA), where a second layer of authentication is used. For example, popular methods use smartphone in addition to a password by requiring user to provide a signature code, known as token, which is either generated by an app (e.g., Google Authenticator) or sent to the phone through an app (e.g., Duo Push) or short message service (SMS). Major drawbacks of MFA are that they disturb the user for input, and they cannot enable continuous authentication.

With regard to continuous authentication, there is no commercial product currently in the market that is capable of continuous authentication for Internet services (e.g., email and other cloud services) and suitable for large-scale adaptation. Existing multi-factor authentication systems such as Duo Push and Google Authenticator cannot provide automated or continuous authentication. Users need to use their phones for authentication, which becomes a nuisance when requested repeatedly. While there is research on continuous authentication based on user behaviors, such as finger pressure on screen, its reliability is low, and it may be considered intrusive.

There are several wearable devices such as smart watches and smart rings that are used for authentication in contactless payment, ticketing, and access to buildings, cars, etc. However, there are several obstacles that prevent widespread use of wearable devices for authentication in Internet services. Firstly, their price is high and not feasible for large-scale adaptation. Also, wearing a watch or ring does not appeal to everyone. Moreover, they typically need an NFC (near-field communication) reader, which is not a standard hardware in computers and smart phones. Similarly, existing RFID tags/cards require a special reading device. Because of the reader and a microchip to store information, the cost of an RFID authentication system is also significantly high. RFID tags are also vulnerable to practical attacks. An attacker with a reader can easily access the stored key in the microchip.

It is with respect to these and other considerations that the various aspects and embodiments of the present disclosure are presented.

SUMMARY OF THE INVENTION

The present disclosure is directed to systems and methods for providing continuous authentication that can greatly enhance the security level by automatically logging out in real-time when the absence of authorized user is detected. The security level is also enhanced by the presented hardware-based authentication. In the presented technology, no digital key is stored in the device that attackers can easily access; authentication is performed by only utilizing the unique characteristics of the hardware.

Further aspects and features of embodiments of the present disclosure will become apparent to those skilled in the art upon reviewing the following detailed description.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF DRAWINGS

The components in the drawings are not necessarily to scale relative to each other. Like reference numerals designate corresponding parts throughout the several views.

FIGS. 3A and 3B illustrate phase signature w.r.t. a reference antenna in spherical coordinates;

FIG. 4 illustrates a circuit diagram of a CAA. Each chaotic antenna element is sequentially turned on using switches and has a random and direction-dependent phase signature due to its unique geometry;

DETAILED DESCRIPTION OF THE INVENTION

Figure 1:
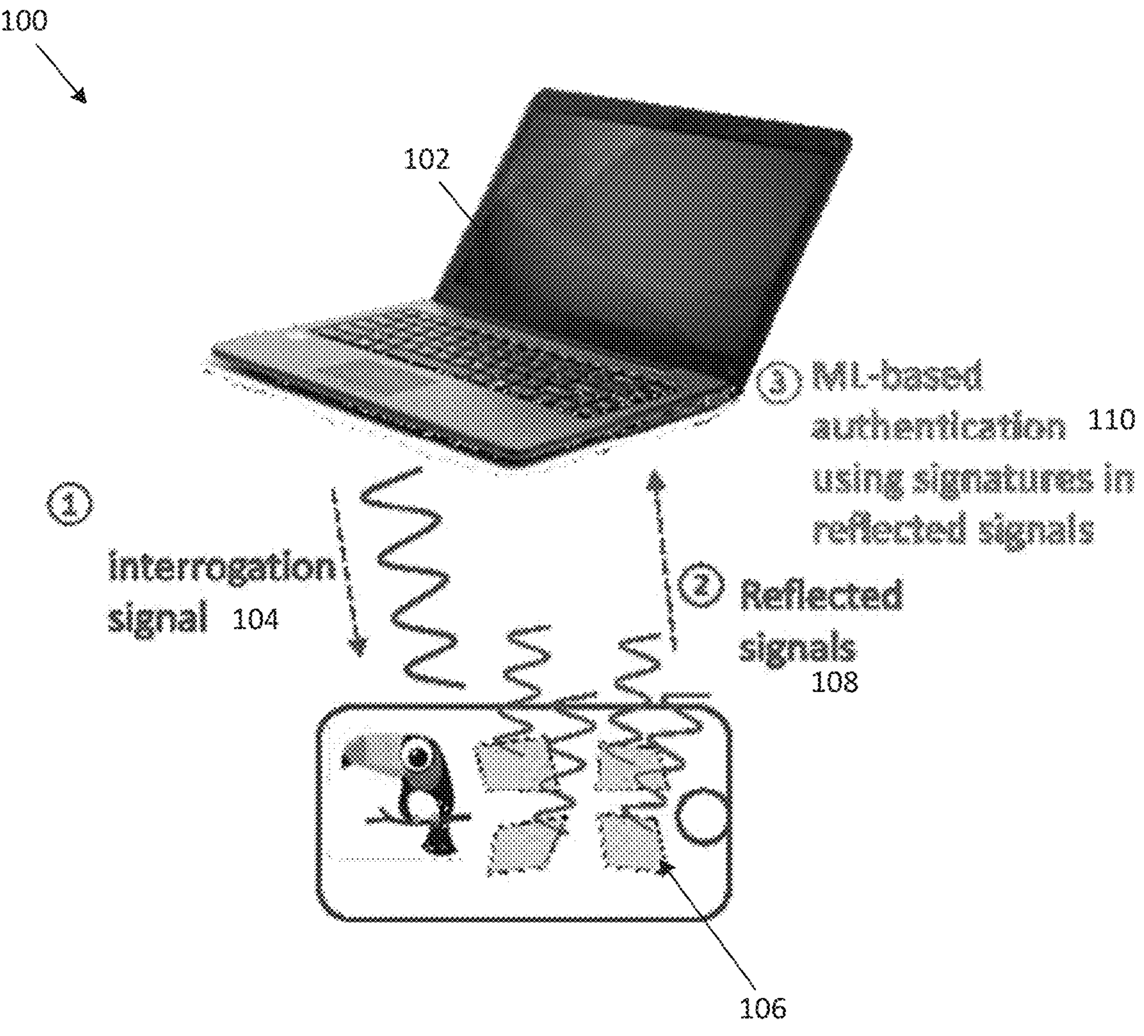
FIG. 1 illustrates high-level overview of the continuous authentication system in accordance with aspects of the present disclosure.

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Overview

The present disclosure describes a novel approach, based on additive manufacturing to enhance the RF signatures to a level for use as a continuous authentication mechanism that will be suitable for commercial and other applications. The approach improves upon radio frequency (RF) fingerprinting, which uses the unique patterns imprinted to the electromagnetic waves transmitted from a wireless device. These patterns result from the randomized errors introduced during the fabrication of the RF hardware; however, because manufacturing platforms are optimized to minimize such errors, existing signatures are not sufficient for highly accurate and reliable authentication needed for commercial applications.

The present disclosure describes intentional randomization of the antenna geometry of a device to obtain significantly enhanced and uniquely distinct signatures. Implementations may be realized in a tag that has a potential to cost less than $10, can be carried on a keychain, and use Bluetooth or WiFi, which are conventional wireless communication standards in computers and phones. The tags do not need to store any information, which lowers the hardware cost considerably and improves security against attackers as authentication is performed through the unique signal propagation patterns of CAAs.

FIG. 1 illustrates an example high-level overview of the continuous authentication system of the present disclosure. The system 100 may include an interrogation module 102 that may be a software application running on a computing device, smartphone or other device that transmits interrogation signals 104 using Bluetooth (2.4 GHZ), WiFi (2.4 or 5 GHZ) or other readily available RF transmission technology. A tag 106 may include, for example, four (or other number) additive randomized antenna elements within the size of a, e.g., keychain tag. A machine learning (ML) authentication module 110 receives reflected signals 108 from the tags 104 and, using deep neural networks, continuously authenticates the tags 104 with a sufficient high accuracy (e.g., >99%).

In accordance with the present disclosure, a novel randomized antenna array concept, called Chaotic Antenna Array (CAA) is utilized to provide for significantly enhanced RF signatures, and in turn highly accurate authentication. In CAAs, shapes of the antenna elements, their locations within the array grid, and their feed networks are intentionally randomized based on a desired probability density function. Although such geometry randomizations can possibly be realizable with several techniques, such as the widely available printed circuit board (PCB) manufacturing, laser-enhanced direct print additive manufacturing (LE-DPAM) stands out as the strongest candidate. Unlike many types of traditional manufacturing, LE-DPAM is mask-free and generates the device structure layer-by-layer, making randomizations available for cost-free. We have shown capabilities of LE-DPAM in realizing antennas and arrays with embedded control ICs and RF/digital lines-paving the way for introducing randomizations at any level of the device structure.

Figure 2A:
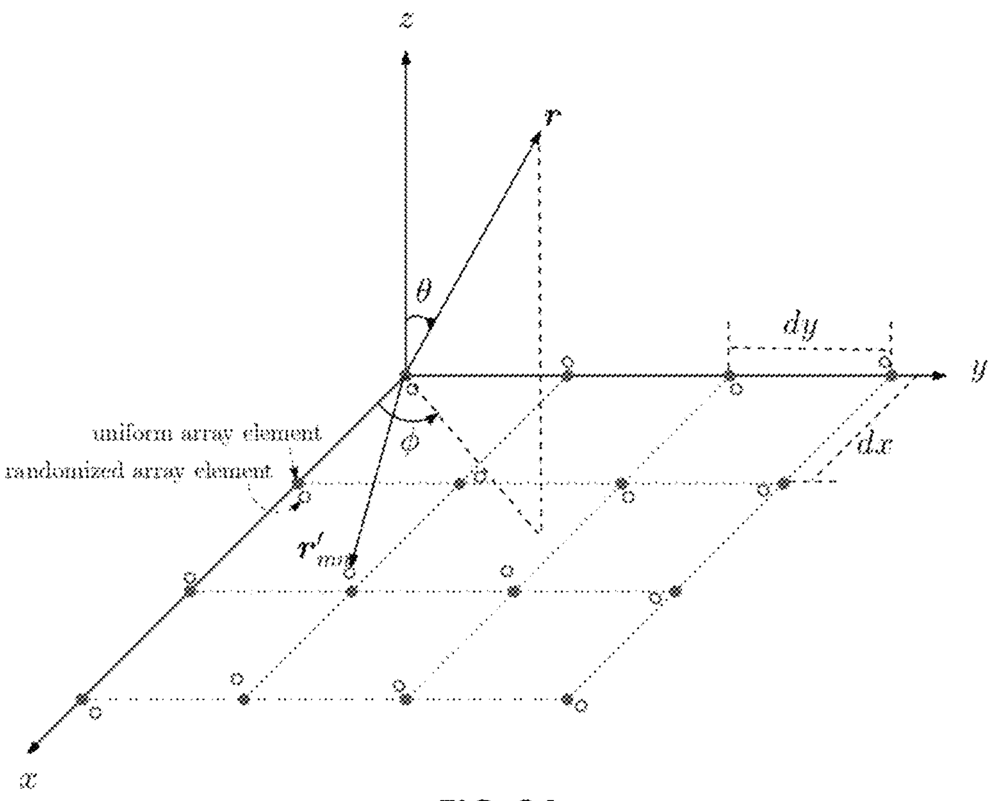
FIG. 2A illustrates randomized antenna center locations in Chaotic Antenna Array (CAA), which are shown with red unfilled circles. 3D array geometry to study electric field radiation.
Figure 2B:
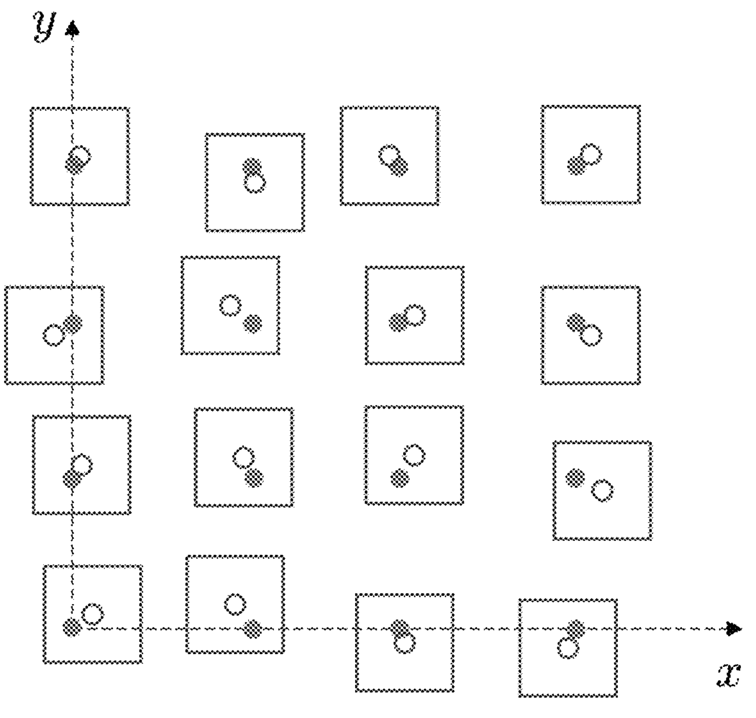
FIG. 2B illustrates a 2D sketch of CAA with randomized antenna elements shown as red squares.

Traditional uniform rectangular array antenna center locations are shown with green filled circles. Randomized antenna center locations in CAA are shown with red unfilled circles. 3D array geometry to study electric field radiation (FIG. 2A). 2D sketch of CAA with randomized antenna elements shown as red squares (FIG. 2B). In accordance with the present disclosure, CAA based system for continuous authentication operates without the knowledge of wireless channel or its own signatures by utilizing deep learning-based detection algorithms. Another key novelty is related to the antenna element position randomization. This type of randomization generates an antenna element specific phase error (i.e. RF fingerprint) that is transmitted with spatial (i.e., θ, ϕ) variance with respect to the classical antenna array factor (FIG. 3B). This type of spatial variation greatly benefit physical layer authentication. When combined with antenna element specific feed line length randomization (which creates a large scale phase error, but with no spatial variance (FIG. 3A)), the CAA provides orders of magnitude enhanced RF fingerprint, which form a strong signature for ML based authentication techniques.

Thus, the system of the present disclosure of additively manufactured unclonable randomized antenna arrays and detection of their enhanced signatures with deep neural networks provides a solution to the deficiencies of the conventional systems.

Chaotic Antenna Array Mathematical Model

The mathematical model of the Chaotic Antenna Array (CAA) to study the electric field for a randomized antenna array will now be presented. The model starts with a traditional rectangular array consisting of M×N antennas arranged uniformly on a rectangular grid. Centers of antenna elements in a traditional array are illustrated by the filled green circles in FIG. 1A. The center position of antenna element (m, n), m=1,2, . . . , M, n=1,2, . . . , N without any perturbation is denoted by the position vector $r_{mn}$, which can be written as:

$$r_{mn}=(m-1)d_x\hat{x}+(n-1)d_y\hat{y}, \tag{1}$$

where $\hat{x}$ and $\hat{y}$ are unit vectors, $d_x$ and $d_y$ are the distances between the two antenna elements in the direction of x-axis and y-axis, respectively. Throughout the disclosure, bold text is used for vectors. Each antenna element, by itself, at the center of the coordinate system radiates the electric field $$E_{mn}=e_{mn}(\theta,\phi)\frac{e^{-jkr}}{r} \tag{2}$$

where $e_{mn}$ represents the field pattern in spherical coordinate system as a function of ϕ and θ; r is the distance to observation point, k is the wavenumber given by $$\frac{2\pi f}{c},$$

where f denotes frequency and c is the speed of light. Ignoring the mutual couplings, and assuming identical antenna elements for the array, we can express $e_{mn}(\theta,\phi)=e(\theta,\phi)\ \forall mn$. Although randomization of antenna shapes is also possible, we do not investigate such randomizations in this work.

The location of each antenna element is purturbed within the uniformly spaced antenna array. The locations of the antenna elements are denoted by the unfilled red circles in FIG. 2A and can be expressed as $$r'_{mn}=(m-1)d_x\hat{x}+(n-1)d_y\hat{y}+\alpha_{mn}(\hat{x}\cos\gamma_{mn}+\hat{y}\sin\gamma_{mn}) \tag{3}$$

where $\alpha_{mn}\in U(0,\alpha_{max})$ and $\gamma_{mn}\in U(0,2\pi)$ are uniformly distributed perturbation magnitude and angle $\alpha_{max}$ denotes the maximum radius of perturbation. In a practical CAA realization, $\alpha_{max}$ will be restricted by the amount of mutual coupling that can be tolerated by the wireless communication system. For a regular antenna array with antenna elements spaced in half-wavelength increments, $\alpha_{max}$ therefore will be limited to fractions of a wavelength and generating phase errors not reaching up to the full $2\pi$ range. To address this, we also introduce a random perturbation in the feed line length of each antenna element, which will generate an additional phase term, of $e^{-jL_{mn}}$ in the electric field equation, where $L_{mn} \in U(0,2\pi)$.

Based on the well-known far-field approximations in antenna theory, electric field radiated by an antenna element located at $$r'_{mn}$$

can be written as $$E_{mn} = e(\theta, \phi)\frac{e^{-jk(r-\hat{r}\cdot r'_{mn})}}{r}e^{-jL_{mn}}, \tag{4}$$

where $$\hat{r} = \hat{x}\sin\theta\cos\phi + \hat{y}\sin\theta\sin\phi + \hat{z}\cos\theta \tag{5}$$

is the unit vector along the direction of observation. Rearranging and carrying out the vector dot product in (4) leads to the expression $$E_{mn} = e(\theta, \phi)\frac{e^{-jkr}}{r} \times e^{jk(m-1)d_x \sin\theta\cos\phi} \\ e^{jk(n-1)d_y \sin\theta\sin\phi} \times e^{jk\alpha_{mn}\cos\gamma_{mn}\sin\theta\cos\phi}e^{jk\alpha_{mn}\sin\gamma_{mn}\sin\theta\sin\phi} \times e^{-jL_{mn}}. \tag{6}$$

The first two lines in equation (6) are well recognized as the terms of the array factor belonging to a traditional uniformly spaced antenna array structure. On the other hand, the terms in the third and fourth lines are generated by the randomizations introduced to create the CAA. Therefore the phase delays implied by these terms can also be considered as "phase errors" or "phase signatures" that are unique to the CAA. More specifically, the terms in the third line stem from the antenna location randomizations $\alpha_{mn}$ and $\gamma_{mn}$. These terms are dependent on $(\theta, \phi)$, implying a spatial variance in 3D space. The fourth line is the phase delay due to the feed line randomization $L_{mn}$. This term has no $(\theta, \phi)$, hence the phase delay is transmitted identically to entire 3D space.

FIGS. 3A-3B illustrate the phase signature and spatial variance properties of an antenna element of a CAA with respect to its own unperturbed location and reference line. Feed line length randomization alone creates a signature transmitted equally in all directions, like the traditional RF fingerprint, but significantly enhanced. On the other hand, when antenna position randomization is included on top of feed line randomization, a phase variation that depends on the direction of radiation is generated as evidenced by the colorful phase distribution in FIGS. 3A and 3B, which show phase signature with respect to a reference antenna in spherical coordinates. Feed line randomization generates a constant signature in all transmission directions (FIG. 3A).

Antenna geometry randomization creates $\theta$, $\phi$ dependent signature (FIG. 3B). In the figures, circular angle represents $\phi$ and radius (i.e., circles within each other) represents the $\theta$ variation. The colormap shows the phase difference.

Authentication

Early RF fingerprint authentication schemes used statistical detectors, and wavelet transforms. More recently, traditional machine learning methods have been applied to this problem, such as k-Nearest Neighbors or Support Vector Machines, among others. Present state-of-the-art relies on deep neural networks where deep convolutional neural networks (CNNs) can successfully authenticate naturally occurring signatures in the RF chain in idealized setups with a small number of devices, according to recent literature. However, as recently showed in a sizable study that naturally occurring RF fingerprints are insufficient even for cutting-edge deep CNNs (63% accuracy) under realistic circumstances with a large number of devices and changing channel conditions between training and testing. This section presents the proposed authentication scheme based on CAA and shows that the enhanced RF fingerprints of CAA enable close-to-perfect (99%) authentication accuracy in scenarios similar to the ones considered in the existing study in which traditional RF fingerprinting could not provide high accuracy (63%).

FIG. 4 depicts an example circuit diagram 400 of the CAA used in accordance with the present disclosure. The spatially dependent phase signatures of each antenna element (402A, 402B, 402C . . . 402N) are represented with $e^{j\psi h(\theta, \phi)}$, h=1,2, . . . . H=MN terms that follow the switches (404A, 404B, 404C . . . 404N) and digital phase shifters 406. The digital phase shifters 406 are for analog beamforming during the wireless communication stage. On the other hand, switches (404A, 404B, 404C . . . 404N) are included to provide access to individual antennas (402A, 402B, 402C . . . 402N) during the proposed CAA based authentication method.

Method of Authentication with CAA and Example Threat Model

Figure 5:
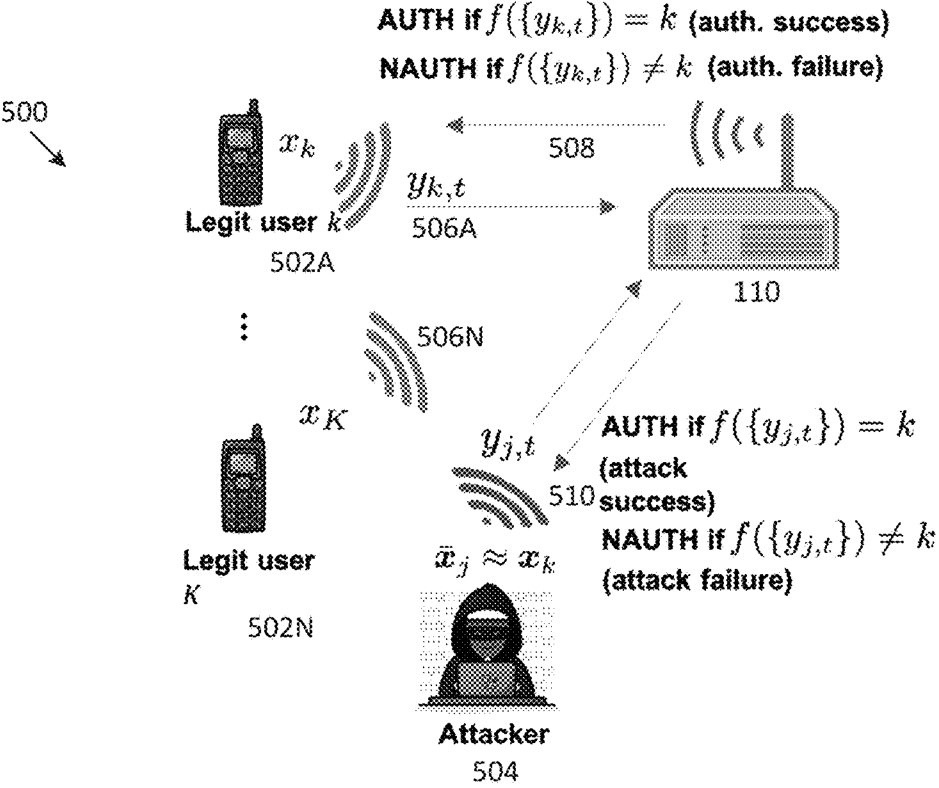
FIG. 5 illustrates an example threat model and method for authentication.

With reference to FIG. 5, there is shown an example method of authentication and threat model. Consider a physical layer (PHY) authentication system employing CAAs, in which a set $\mathcal{L}$ of K legitimate users 502A . . . 502N first authenticate their identity before receiving service. In a targeted example, an attacker 504 knows the login credentials of a legitimate user and tries to spoof its RF fingerprint (carried on one of pilot signals 506A . . . 506N). In an untargeted example, login credentials are not used in upper layers and authenticator checks only the RF fingerprint, e.g., AUTH if $f(y_{k,i}) \in \{1, \ldots, K\}$, NAUTH if $f(y_{k,i})=0$.

During authentication, user k 502A . . . 502N transmits (in case of an active CAA tag with battery) or reflects (in case of a passive CAA tag with no battery) a complex pilot signal 506A . . . 506N by sequentially turning on its H antennas 402A, 402B, 402C . . . 402N using the switches 404A, 404B, 404C . . . 404N as shown in the block diagram of CAA in FIG. 4. Each chaotic antenna element 402A, 402B, 402C . . . 402N is sequentially turned on using switches 404A, 404B, 404C . . . 404N and has a random and direction-dependent phase signature due to its unique geometry.

This provides the authenticator 110 with a H-dimensional complex fingerprint $x_k \in \mathbb{C}^H$, which includes the random phase response of each antenna element 402A, 402B, 402C . . . 402N.

A distorted fingerprint $y_{k,t} \in \mathbb{C}^H$ may be received by the authenticator 110 during the authentication session because of wireless channel uncertainties such as multiplicative and additive noise, multipath fading, Doppler shift, etc. To deal with such uncertainties, the authenticator builds a function $f(\{y_{k,t}\}) \in \{0,1, \ldots, K\}$ in a secure training session using several training data instances received from all legitimate users. Success in authentication is defined as $f(\{y_{k,t}\})=k$ for $k \in \mathcal{L}$ or $f(\{y_{j,t}\})=0$ for an illegitimate user $j \notin \mathcal{L}$.

An impersonation attack is defined as an illegitimate user $j \notin \mathcal{L}$ (504) trying to authenticate as a legitimate user 502A . . . 502N. If there is also an upper layer authentication system, such as password and MAC address, in addition to PHY authentication, then the attacker 504 must target a specific legitimate user 502A . . . 502N. In such targeted attack, as shown in FIG. 5, the attacker 504 aims to design an RF fingerprint $\bar{x}_j \approx x_k$ (in signal 510), different than its own fingerprint $x_j$ through a software, so that $f\{y_{j,t}\})=k$, where $\{y_{j,t}\}$ is the received signal as a result of transmitted $\bar{x}_j$. When there is no additional authentication system, the attacker 504 may also perform an untargeted attack by simply trying to get authenticated as any of the legitimate users, i.e., $f(\{y_{j,t}\}) \neq 0$.

Simulation Setup-Experimental Results

For a study on the feasibility of RF fingerprint authentication using CAA, data was generated using the mathematical framework described above. The dataset includes the phase variation of 1200 antenna elements, forming K=300 CAAs each with H=4 antenna elements. $\alpha_{max}$ was set at 4 mm, $d_x$ and $dy$ were both set at 26 mm, and the radial distance r of observation point was set at 5 m. The azimuthal angle $\phi$ and the polar angle $\theta$ from the transmitting CAA to the receiver is randomly selected within [−180°, 180°] and [0°, 75°], respectively. A f=5 GHZ WiFi environment was simulated with Rayleigh multipath fading, in which people may be walking between the device and the router. Considering a movement speed $V_{move}$ ranging from 0.1 m/sec to 10 m/sec, the maximum Doppler shift fa is between 16.67 Hz and 166.7 Hz following the formula $f_d=(V_{move}/c)f$. The channel coherence time under the Clarke's model, $T_c=0.423/f_d$, ranges from approximately 0.0254 to 0.00254 sec. Also, the sampling rate $F_s$ is varied between 10 KHz and 1 MHz to test the robustness to different test environments. Collecting $T_a$=1,000 samples within an authentication sequence we obtained datasets for different scenarios.

In each authentication sequence, the four antennas in a CAA are turned on sequentially to transmit a complex pilot signal. The authenticator receives the in-phase and quadrature (I/Q) samples through Rayleigh multipath fading channels in addition to additive white Gaussian noise:

$$y_{i,t} = h_{i,t} x_i + w_{i,t} \tag{7}$$

where $x_i = e^{j\psi i(\theta,\ \phi)}$ is the transmitted pilot signal from antenna i of CAA k with constant amplitude and the corresponding phase signature $\psi_i(\theta, \phi)$ (array index k is dropped for notational simplicity);

$$h_{i,t} \sim \mathcal{N}_c(0, \sigma_h^2)$$

is the zero-mean complex Gaussian channel coefficient; and $$w_{i,t} \sim \mathcal{N}_c(0, \sigma_w^2)$$

is the additive white complex Gaussian noise. The I and Q samples are the real and imaginary parts of the received signal $y_{i,t}$. With four antenna elements in each array and collecting I and Q samples of the received signal from each antenna, the data used to authenticate a CAA has a size of $T_a \times 8$, where $T_a$=1000 is the number of samples within an authentication session. The CAA phase signatures and the received signals through Rayleigh fading channels were simulated in MATLAB. Power amplifier non-linearities were applied to each CAA using a Volterra series:

$$f_{PA}(x_t) = x_t\left(1 + \psi_0 |x_t|^2 + \psi_1 |x_t|^4\right) \tag{8}$$

where $x_t$ is the most recent I/Q sample, and $\psi_0$, $\psi_1$ are coefficients unique to each power amplifier. The signal-to-noise ratio (SNR) is set to 20 dB in the simulations, i.e., $$\sigma_w^2 = 0.01.$$

By varying $V_{move}$ and $F_s$, 7 different datasets were created to allow testing under different scenarios. Table 1 summarizes the different datasets and their properties.

TABLE 1

| Dataset Parameters | | | | | | | |
|---|---|---|---|---|---|---|---|
| VarSet | 1 | 2 | 3 | 4 | 5 | 6 | 7 |
| $F_s$ (kHz) | 10 | 10 | 10 | 10 | 10 | 100 | 1000 |
| $V_{move}$ (m/s) | 1 | 5 | 10 | 0.5 | 0.1 | 1 | 1 |
| $f_d$ (Hz) | 16.7 | 83.3 | 166.7 | 8.3 | 1.7 | 16.7 | 16.7 |
| $T_c$ (sec) | 0.025 | 0.005 | 0.003 | 0.051 | 0.25 | 0.025 | 0.025 |

Deep Learning Classifiers

To comprehensively study how effective ML platforms could authenticate CAAs, 5 different convolutional neural network (CNN) classification architectures were selected. A basic CNN consisting of two convolutional layers, each with 64 neurons followed by max-pooling layers, and a single dense layer for classification forms the baseline performance comparison for the following models. The four other models include VGG-16, a classical 16 layer neural network; ResNet-50, a 50-layer CNN with residual connections between layers to allow gradients to propagate through the network without vanishing; InceptionV3, a deep CNN which utilizes a "network within a network" strategy to learn features more deeply; and Xception, the final iteration of the Inception network, which utilizes residual connections and separable convolutional layers to improve accuracy. These four different models represent a spectrum from simpler to state-of-the-art for image classification, and with slight modification, can be adapted to RF fingerprint authentication. The models originally require input in the shape of 244×244×3, so modifications to the top layers were necessary to work with the received I/Q samples of size 1000×8×1, where the 8 columns correspond to the I and Q signal samples from the 4 antenna elements.

Through MATLAB simulation, 110 authentication sequences for 300 CAAs was formed. The data is partitioned using a 100-10 split for training and testing, respectively. During offline training, the 5 classifiers described above are trained to map the input $x_k$, $k \in \mathcal{L}$, to probabilities $\{p_i\}$ for each user $i \in \mathcal{L}$, where $\Sigma p_i=1$, indicating the probability of input sequence $x_k$ belonging to user i. The output probability vector is used to compute the cross entropy loss:

$$L_{CE} = -\sum_{i=1}^{\mathcal{L}} z_i \log p_i \tag{9}$$

where $z_i$ represents the one-hot-encoded ground truth, taking the value 0 for every user in $\mathcal{L}$ except the user which transmitted the data. The resulting loss is back-propagated using stochastic gradient descent to optimize the network parameters over the training process. For inference on the test set, we declare the transmitting device to be $\hat{i}$ for which $p_i$ is maximized:

$$\hat{i} = \underset{i}{\operatorname{argmax}}\, p_i \tag{10}$$

The overall accuracy over the test set is defined as the sum of correct classifications divided by the number of test instances.

Results

Each network was trained to convergence, ranging from 10 iterations for the baseline CNN to 100 for Inception. Due to the depth of the VGG model, with approximately 138 million trainable parameters, it is impossible to train on such a small dataset in one attempt. To facilitate training the model, firstly, Everything except the top 7 convolutional layers removed and trained on the dataset. The weights from this training were transferred over to the full model, then frozen. With the top layers frozen, the the bottom of the network could be trained. The fully trained network was used for test classification performance.

Table 2 shows the test classification accuracy for each of the networks trained and tested on each dataset. Experiments were conducted using Python with the PyTorch package, using an RTX 4090 GPU with 24 GB of VRAM. The training time for each network depends on the architecture, number of trainable parameters, batch size, and processing power. The training time for the simple CNN was 23s, while pre-trained Inception V3 from Torchvision package took longest of about 2.64 hours. Even the baseline CNN-3 scores significantly above the 63% accuracy, which is the existing state-of-the-art performance in the literature achieved by ResNet-50 using the traditional (non-CAA) RF fingerprints. The more advanced networks, VGG-16 and ResNet-50, Inception, and Xception, all have near perfect accuracy, with the only difference being datasets 5 and 6. It is not surprising that Xception scores highest out of 6 of the 7 datasets, as it combines architecture from both ResNet and Inception, allowing it to learn features more deeply than either one. The classification accuracy is extremely high, beating state-of-the-art classical RF fingerprint accuracy even on the hardest datasets. Comparing the performances of ResNet-50 using the CAA fingerprints (>99%) to the traditional RF fingerprints (63%) in similar setups, we see that the CAA fingerprints enable significantly enhanced authentication capacity with the help of deep neural networks.

TABLE 2

Test Accuracy with Models Developed from scratch on Generated Data

| ModelSet | 1 | 2 | 3 | 4 | 5 | 6 | 7 | Training Time (s) | Testing Time(s) |
|---|---|---|---|---|---|---|---|---|---|
| CNN-3 | 84.33 | 96.87 | 98.48 | 73.39 | 47.75 | 49.84 | 93.09 | 23(1)(15 Ep) | 0.08(1) |
| VGG-16 | 88.69 | .92.69 | 95.69 | 83.00 | 55.15 | 60.30 | 98.60 | 209(9)(15 Ep) | 0.35(4) |
| ResNet-50 | 89.90 | 98.60 | 99.45 | 73.66 | 58.78 | 58.87 | 99.90 | 267(12)(5 Ep) | 1.60(20) |
| Inception (Torchvision) | 81.12 | 97.42 | 99.27 | 67.30 | 40.30 | 41.09 | 97.45 | 7892(343)(25 Ep) | 9(112) |
| Xception | 91.57 | 99.03 | 98.87 | 84.15 | 56.06 | 59.27 | 97.51 | 5201(226)(10 Ep) | 16(200) |
| Inception Pretrained (Torchvision) | **91.66** | **99.60** | 99.36 | 81.36 | 54.39 | 56.72 | 96.63 | 9512(413)(30 Ep) | 9(112) |
| Xception Pretrained (PyPI) | 90.69 | 99.18 | 99.69 | **85.72** | **67.54** | 72.12 | 99.57 | 668(29)(50 Ep) | 0.66(22) |
| ResNet50 Pretrained (PyPI) | 90.81 | 99.57 | **99.84** | 85.72 | **70.75** | **72.51** | **99.93** | 670(29)(50 Ep) | 0.40(5) |

Figure 6:
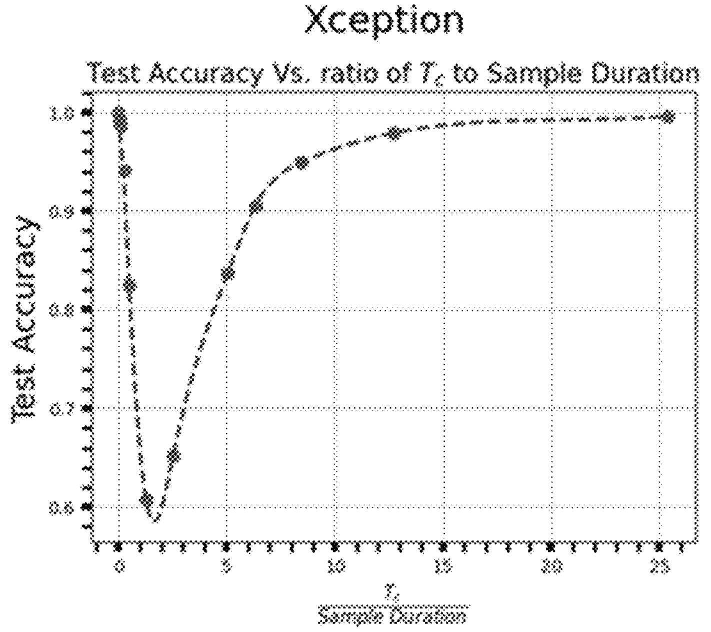
FIG. 6 illustrates how the accuracy for Xception varies with different ratios of $T_c$ to $T_s$.

The classification accuracy depends on $V_{walk}$. With $F_s$ at 10 kHz, it is counter-intuitive to think that a lower $V_{walk}$ results in lower accuracy. This is related to the channel coherence time $T_c$ being nearly equivalent to the sample duration $T_s=N/F_s=0.1$ sec. For N=1000 and $F_s=10$ kHz, $T_c$ equals $T_s$ when $V_{walk}=0.25$m/s. FIG. 6 shows how the accuracy for Xception varies with different ratios of $T_c$ to $T_s$. In particular, FIG. 6 shows test set classification accuracy when sweeping $T_c/T_s$ from 0.005 to 25.4, ($V_{walk}=0.01$m/s to 50m/s). The minimum is 62.1% accuracy at $T_c/T_s=1$. For fast fading scenarios ($T_c/T_s<1$) the accuracy very quickly reaches 100%, while for slow fading ($T_c/T_s>1$), the accuracy, while not as sharp of an increase, reaches nearly 100% at $T_c/T_s=15$, when $V_{walk}=0.05$ m/s. When $T_c=T_s$, the samples in the authentication sequence become correlated, meaning that there is a statistically significant predictor function which relates samples in time. Depending on the magnitude of this correlation, the models will prefer to learn that correlation rather than the unique phase distortion from the RF fingerprints, leading to reduced performance. The further $|T_c/T_s|$ is from 1, the less correlated the samples are, leading to higher classification accuracy for all networks.

In testing and simulation of additively manufactured the chaotic antenna array (CAA) and the RF signatures of 300 randomized antenna arrays each with 4 antenna elements, machine learning (ML) algorithms have been developed to successfully recognize those 300 RAAs with more than 95% accuracy for continuous authentication.

Practical Realization of CAA Elements Using Additive Manufacturing

Randomization in antenna positions and feed line lengths can be carried out with the traditional manufacturing technologies. However, this is expected to be costly since low-cost is only achieved for replication of identical circuits. To enable cost effectiveness, we investigate practical realization of the CAAs using additive manufacturing (AM). AM is mask-free and can form a 3D structure layer by layer. Hence, randomization of geometry can be carried out with no additional cost by randomizing the printing files and/or the motions and materials of the manufacturing heads. Recent research work has already demonstrated that laser enhanced direct print additive manufacturing (LE-DPAM) technique can be employed to realize multilayered patch antennas, structurally embedded ICs, and packaging of ICs with antennas up to mm-wave frequencies, with performances comparable to those attainable from conventional manufacturing.

Figure 7:
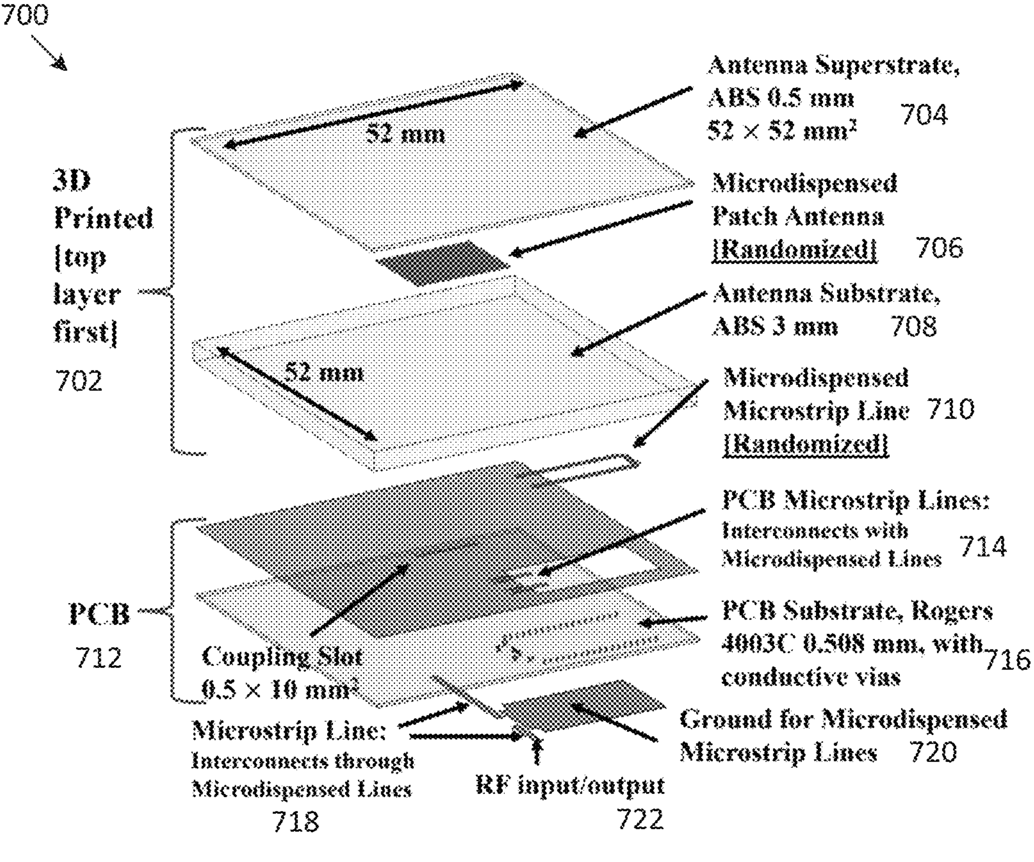
FIG. 7 illustrates a 3D structure of the antenna element proposed for practical CAA realizations.

FIG. 7 presents an example 3D structure 700 of the antenna element proposed for practical CAA realizations. Although LE-DPAM can manufacture the entirety of the shown structure, a hybrid assembly is proposed to combine the best of two manufacturing techniques (i.e. low-cost and rapid production of detailed but identical geometries with PCB vs. low-cost manufacturing of randomized geometries with LE-DPAM). To minimize the area of conductive traces manufactured with LE-DPAM (for faster manufacturing speed), an aperture coupled patch antenna is considered. The LE-DPAM (i.e. 3D printed) part 702 consists of four material layers. Two of these are dielectric acrylonitrile butadiene styrene (ABS) layers 704 and 708 ($\in_r=2.6$, $\tan\delta=0.0085$) that is manufactured by the Fused Deposition Modeling (FDM) capability of the LE-DPAM. Remaining two layers are formed from CB028 conductive paste ($\sigma=1\times10^6$ S/m) by using the microdispensing capability of the LE-DPAM. Laser processing or micro-milling the edges of the conductive traces are likely to be not needed for the shown conductive layers (i.e. antenna and microstrip line) due to the larger dimensions for operation at the 5.8 GHZ ISM band. The 3D printed part 702 is designed to be manufactured in LE-DPAM platform in an upside-down manner. First the 0.5 mm ABS 704 is printed using FDM to form the material base. This layer 704 also acts as a cover to hide the antenna element 706 from visual inspection. The process follows with microdispensing of conductive paste to form the patch. Subsequently, the 3 mm thick ABS material 708 is printed using FDM. This layer acts as the antenna substrate and mainly controls the antenna bandwidth. Finally, the microstrip line 710 is microdispensed to complete the production of the 3D printed structure. Antenna position (relative to the coupling slot) and microstrip line lengths are randomized geometry parameters.

The 3D printed structure will be screwed (or glued/bonded) on to a PCB 712 as illustrated with the substrate stack-up shown in FIG. 7. PCB 716 is a 0.508 mm thick Rogers 4003C substrate layers ($\in_r=3.55$, $\tan\delta=0.0027$) with two layers of conductive traces. One layer 714 carries the RF and antenna ground plane with the antenna coupling slot and a larger cutout area for preventing the overlap with the microdispensed microstrip lines 710. Inside the cutout area, two very short microstrip lines 714 are included as pads to overlap with the tips of the microdispensed microstrip line when the entire structure is assembled. The second layer 716 carries the RF microstrip feed line 718 that enters the PCB and extends over the coupling slot to feed the antenna element. In addition, this layer carries a rectangular shaped trace to act as the ground plane 720 of the microdispensed microstrip line. This trace is connected to the main ground using a set of 0.3 mm diameter conductive vias to prevent undesired radiation. Two 0.6 mm diameter conductive vias are used to connect the RF microstrip line with the microstrip line pads on oppose side of the board. After entering the board from the first conductive layer (i.e. the bottom layer in FIG. 7), RF signal travels to the second conductive layer, passes over randomized microdispensed microstrip line, and travels back to the first conductive layer to feed the antenna element through coupling slot.

Figure 8:
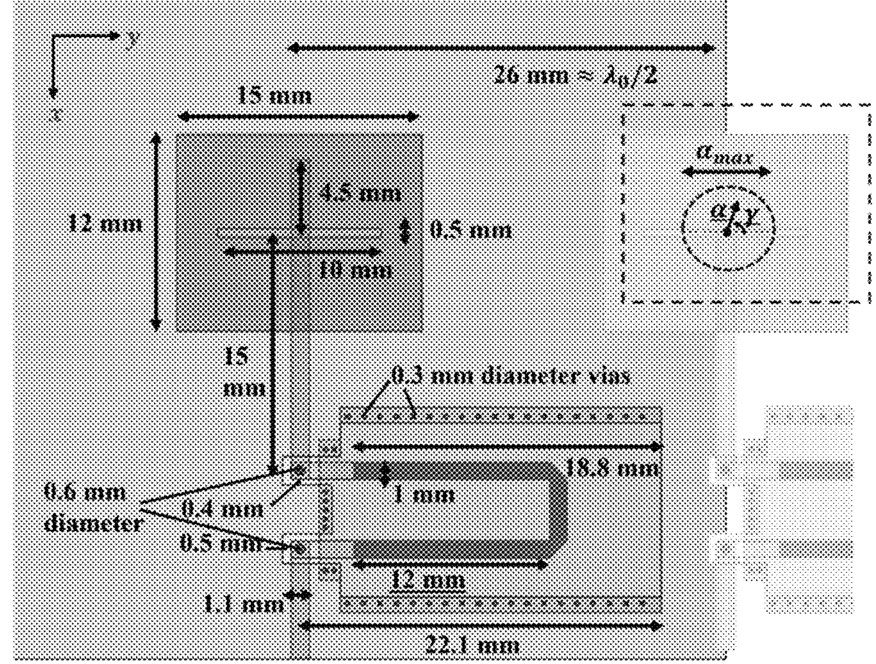
FIG. 8 illustrates a layout of the aperture coupled patch antenna.

FIG. 8 illustrates the layout of the aperture coupled patch antenna of FIG. 7. Although patch dimensions can be randomized to create differences in cross polarization and phase delay, they are left constant in this study. An important aspect of the design is the choice of a relatively thick 3 mm antenna substrate. Since impedance matching of aperture coupled patch antennas are sensitive to the coupling slot position and its dimensions, the thick antenna substrate is utilized to obtain a wideband operation when the antenna element is centered over the coupling slot as shown in FIG. 8. The relative position of patch with respect to the coupling slot is randomized as described above ($\alpha_{max}=4$ mm). This results in frequency shift in antenna element, but antenna remains impedance matched due to its wideband characteristics. The microdispensed feed line is bent to fit more line length within the half wavelength space of an antenna array as shown in FIG. 8. Each bent section can assume a length between 2.5 mm and 16.5 mm. Considering the 2.5 mm length as the reference state, the total microdispensed line length can be randomly enlarged from 0 mm to 28 mm, where the latter corresponds to a ≈360° phase shift within the shown substrate stack-up. 2.5 mm is the length allocated for the overlap with the pads of the feed line on the PCB. This contact-based electrical connection can be further strengthened with the application of silver epoxy. It is also important to note that the feed line width is 1.1 mm for the bottom conductive trace of the PCB since the trace is modeled to be open to air whereas the microdispensed line is an embedded line.

The Ansys Electronics Desktop (EDT) HFSS simulation of the antenna element (with the shown 52×52 mm 2 cross section, but with a short 6.5 mm feed line) shows that the unperturbed antenna operates with 9.4% $|S_{11}|<-10$ dB at the center frequency of 5.75 GHz. The realized gain is 6.7 dBi at 5.8 GHz corresponding to a radiation efficiency of 93%. A MATLAB m-file was written to create a script that automates Ansys EDT HFSS to simulate antenna elements with randomized locations and feed line lengths. The script is also capable of exporting the parameters of interest and repeating the process over the desired number of antenna realizations. Both geometry randomizations are based on uniform distribution as discussed in Section 2.

Figure 9:
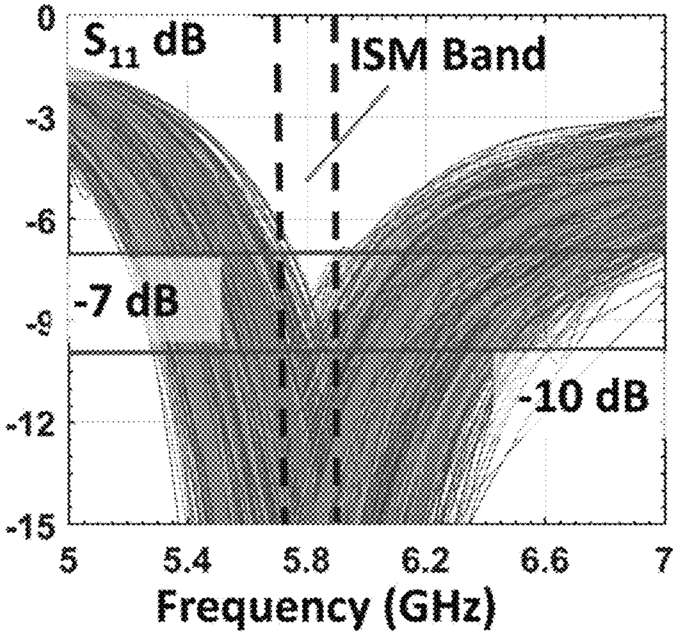
FIG. 9 illustrates a $|S_{11}|$ (dB) performance of 1200 antenna elements automatically simulated with the MATLAB-Ansys EDT HFSS framework.

FIG. 9 shows the $|S_{11}|$ (dB) (i.e. port reflection coefficient) performance of the 1200 antenna elements automatically simulated with the MATLAB-Ansys EDT HFSS framework. Resonance frequency shifts are notably visible due to the displacement of the antenna element over the coupling slot. Nevertheless, due to their wideband performance, all 1200 instances of the antennas maintain a lower than −10 dB $|S_{11}|$ across the ISM band, implying larger than 90% power accepted into the antenna from its port for radiation. The presented study validates that CAAs can be practically realized. Comprehensive manufacturing details, their usage within test nodes and test beds employing software defined radios will be the subject of a future study.

Conclusion

A novel machine learning (ML) based wireless device authentication concept based on RF fingerprinting through the utilization of chaotic antenna arrays (CAAs) was investigated. A spectrum of neural network architectures were trained on seven different wireless channel scenarios with varying fast and slow fading conditions. The authentication performances of these trained models were shown to be promising for advancement of the state-of-the-art in RF fingerprinting based authentication, with even simpler neural networks performing extremely well. It is also seen that more advanced networks achieve perfect accuracy under a variety of scenarios. Performance under scenarios where channel coherence time nears sample duration could be improved; however, the results as they stand indicate that enhanced fingerprints offered by the CAAs nevertheless allows for accurate RF fingerprint authentication. More specifically, the results of deep learning-based authentication utilizing CAA based RF fingerprints were shown to be significantly outperforming the existing state-of-the-art results based on traditional RF fingerprints found in all wireless communication devices. Compared to the 63% accuracy achieved by ResNet-50, a popular CNN architecture, using the traditional RF fingerprints, the CAA fingerprints enable over 99% accuracy by ResNet-50 in the task of authenticating 300 devices under Rayleigh fading channels.

The invention claimed is:

1. A system for continuous authentication, comprising:

an interrogation module running on a computing device that transmits authentication signals as a radio frequency (RF) transmission;

a tag comprising an additively manufactured structure having a plurality of randomized antenna elements that reflect the RF transmission as a reflected signal, wherein the randomized antenna elements are configured such that their geometric locations, shapes, and transmission line lengths are intentionally randomized to generate a unique electromagnetic response; and a machine learning (ML) authentication module comprising a convolutional neural network trained to identify the reflected signal's phase and amplitude signature as a hardware-specific fingerprint, to continuously authenticate the tag.

2. The system of claim 1, wherein the computing device transmits the RF transmission at 2.4 GHz or 5 GHz to the tag.

3. The system of claim 1, wherein randomized antenna elements are a Chaotic Antenna Array (CAA) where shapes and locations of antenna elements within an array grid formed in the tag are randomized based on a predetermined probability density function.

4. The system of claim 3, wherein the antenna position randomization is provided together with transmission line length randomization such that a generated phase variation depends on a direction of radiation.

5. The system of claim 1, wherein the ML authentication module utilizes a convolutional neural network (CNN) classification architecture to authenticate signatures radiated by the tag.

6. The system of claim 5, wherein the tag transmits or reflects a signal to the ML authentication module by sequentially turning on the antenna elements to generate a fingerprint that is unique.

7. The system of claim 5, wherein the CNN is provided as two convolutional layers, each with 64 neurons followed by max-pooling layers, and a single dense layer for classification that forms a baseline performance comparison for trained models.

8. The system of claim 7, wherein the trained models include at least one of a 16-layer network, a 50-layer network and a network within a network topology.

9. A method of authenticating a user, comprising:

receiving login credentials to authenticate a user;

receiving a reflected signal from a passive authentication tag comprising an additively manufactured structure having a plurality of randomized antenna arrays that reflect an RF transmission as a reflected signal, wherein the randomized antenna arrays are configured such that their geometric locations, shapes, and transmission line lengths are intentionally randomized to generate a unique electromagnetic response;

receiving a reflected signal from the passive authentication tag that includes a unique fingerprint; and authenticating the unique fingerprint using a machine learning (ML) authenticator comprising a convolutional neural network trained to identify the reflected signal's phase and amplitude signature as a hardware-specific fingerprint to provide continuous multifactor authentication of the user using the tag.

10. The method of claim 9, further comprising transmitting a radio frequency (RF) transmission at 2.4 GHz or 5 GHz to the passive authentication tag.

11. The method of claim 9, further comprising providing the randomized antenna arrays as a Chaotic Antenna Array (CAA).

* * * * *